Patented June 7, 1949

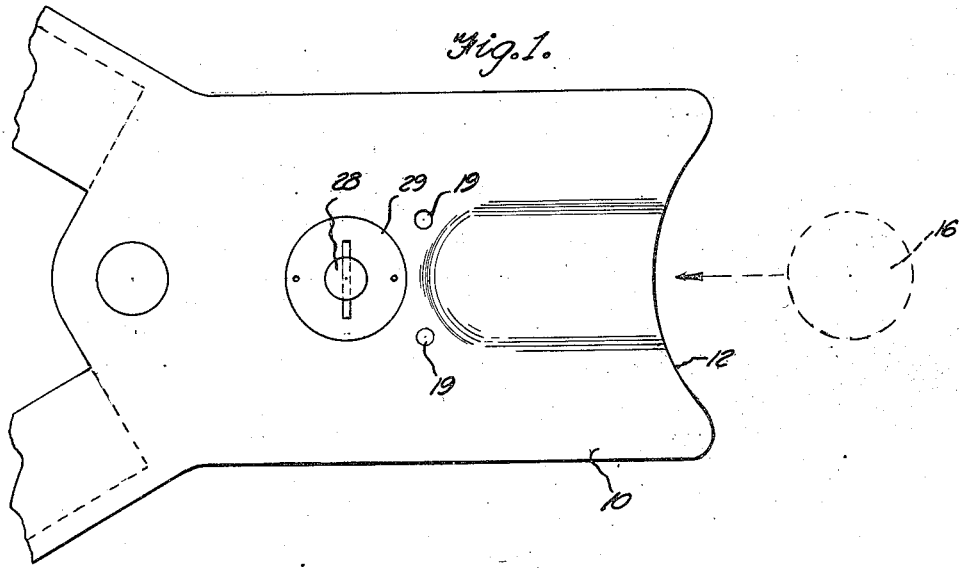
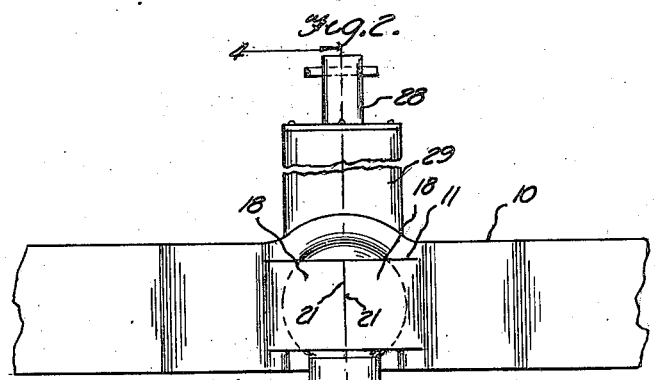
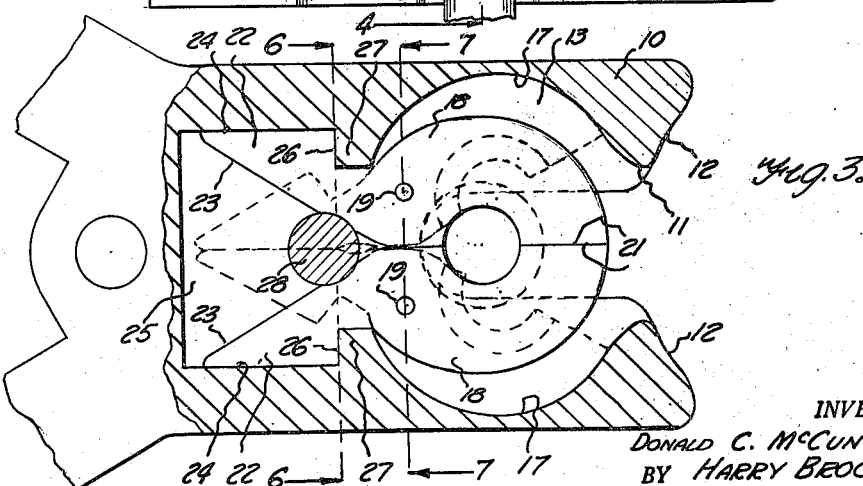

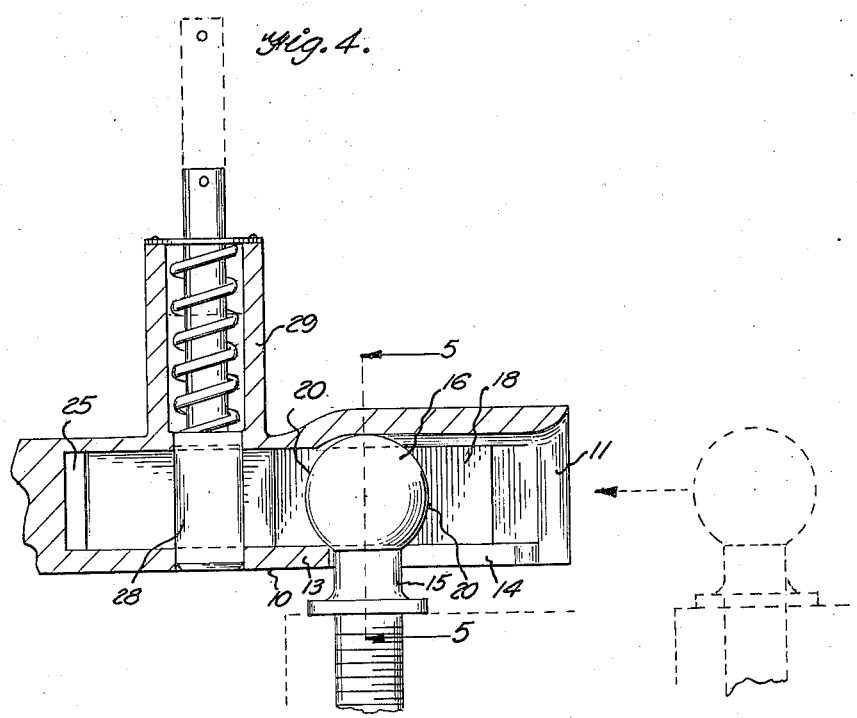
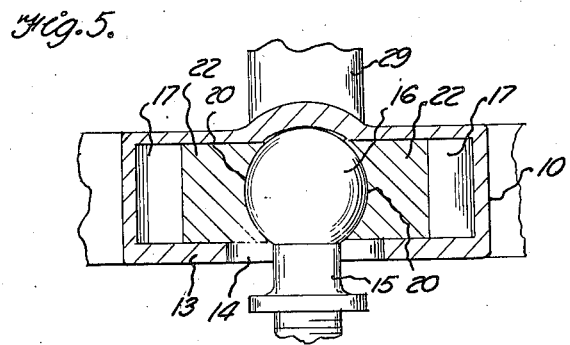
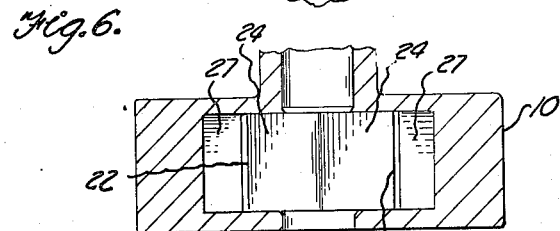
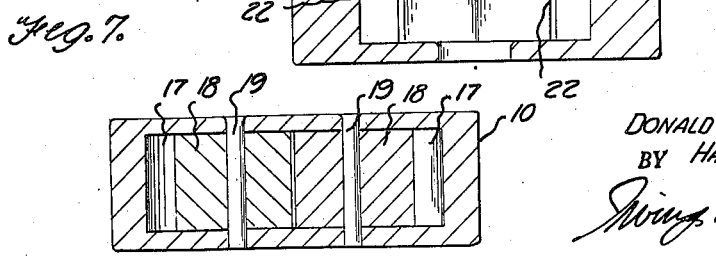

2,472,432

UNITED STATES PATENT OFFICE 2,472,432

TRAILER HITCH

Donald C. McCune and Harry Brooks,
Cleveland, Ohio

Application December 31, 1946, Serial No. 719,494

4 Claims. (Cl. 280—33.17)

1

This invention relates to a trailer hitch and has for one of its objects the production of a simple and efficient trailer hitch or coupling which is so constructed as to efficiently brace the gripping jaws thereof when the jaws are in a closed or gripping position, in a manner to relieve the forward pulling strain from the pivot pins which secure the jaws to the casing of the hitch or coupler.

A further object of this invention is the production of a simple and efficient locking means for automatically locking the jaws of the hitch or coupling in a closed position, as the coupling knob of the prime mover is forced into contact with the jaws of the hitch or coupling.

Other objects and advantages of the present invention will appear throughout the following specification and claims.

In the drawings—

Figure 1 is a top plan view of the hitch or coupling;

Figure 2 is a front elevational view, the jaws being shown in a closed position;

Figure 3 is a horizontal sectional view;

Figure 4 is a vertical longitudinal sectional view taken on line 4—4 of Figure 2;

Figure 5 is a vertical sectional view taken on line 5—5 of Figure 4;

Figure 6 is a sectional view taken on line 6—6 of Figure 3;

Figure 7 is a sectional view taken on line 7—7 of Figure 3.

By referring to the drawings, it will be seen that 10 designates the casing of the trailer hitch which is secured in any desired manner to the trailer or vehicle, to which a prime mover, towing car, tractor or the like, is adapted to be detachably connected. The casing 10 is provided with an entrance opening 11 at its forward end and the forward extremity of the casing 10 is curved inwardly toward the opening 11, as at 12. The casing 10 is provided with a bottom wall 13 having an inwardly-extending slot 14 formed therein to receive the shank or neck 15 which supports the coupling knob 16 constituting the upper end of a vertical weight-supporting coupling member. The casing 13 is provided with enlarged jaw-receiving pockets 17 upon opposite sides of the slot 14 in which the coupling jaws 18 are pivotally secured by means of the journal or pivot pins 19. The casing 10 is provided with a closed top wall which overhangs the slot 14, in spaced relation to the slot 14, and this top wall rests upon the top of the knob 16, when the knob 16 is in a coupling position, thereby placing the

2 weight of the casing 10 and the forward end of the trailer which carries the casing 10, directly upon the top of the vertical weight-supporting coupling member.

Each jaw is substantially semi-circular in formation having a concave knob-receiving socket 20 formed in the inner face of each jaw to conform to the contour of the circular coupling knob 16. The jaws 18 are provided with flat abutting ends 21 which close about the front portion of the coupling knob 16 to secure the knob in a gripping position. Each jaw 18 is provided with a rearward portion 22 having an inner face 23 which is inclined laterally relative to the longitudinal axis of the jaw. The rearward portion 22 of each jaw is also provided with an outer straight face 24 thereby defining the rearward portion 22 of each jaw, as wedge-shaped. These rearward portions 22 are adapted to swing toward and away from each other within the cavity 25 formed in the casing 10. Each rearward portion 22 is provided with a lateral abutment shoulder 26 upon the outer side face thereof adjacent the junction of the jaw 18 with its rearward portion and in rear of the pivot pin 19 of the jaw. The casing 10 is provided with a pair of abutment ledges 27 laterally located with respect to the jaws 18, the rear faces of which extend transversely of the casing 10. These abutment ledges 27 are engaged by the abutment shoulders 26 of the jaws 18, when the jaws 18 are in a closed position and thereby brace the jaws 18 against forward pulling strain. The forward pulling strain of the coupling knob upon the jaws will be taken up by these ledges 27 by contact of the shoulders 26 with the ledges, thereby relieving the pulling strain from the pins or pivots 19. The jaws 18 are properly shaped to freely swing within the pockets 17 and to fit properly around the ledges 27 when the jaws 18 are swung to and from a closed position.

A vertically extending spring-pressed coupling locking pin 28 is carried by the vertical housing 29, and this pin is adapted to automatically drop between the rearward portions 22 of the jaws 18 when the jaws 18 are in a spread-apart position. The jaws 18 will remain in this closed position until the coupling pin 28 is raised above the jaws to permit the jaws 18 to swing to the open position shown in dotted lines in Figure 3.

When it is desired to couple the coupling knob 16 to the jaws 18, the jaws 18 are moved to the dotted position shown in Figure 3, and as the hook 16 is moved in the direction indicated in Figure 1 through the opening 11 shown in Figure 2, the knob 16 passes between the open ends of the jaws 18 and strikes the inner portion of the knob-receiving socket 20. This action will cause the jaws to automatically close about the knob 16 to the position shown in Figure 2. The lower end of the coupling pin 28 rests upon the top faces of the rearward portions 22 of the jaws 18 when they are in an open position as shown in Figure 5, and when the jaws 18 swing to the closed position the spring-pressed coupling pin 28 automatically drops between the rearward portions 22 of the jaws 18, to the position shown in Figures 3 and 4 to lock the jaws 18 in a closed position about the knob 16. The jaws 18 are so shaped at their abutting pivoted portions as to freely swing without binding action.

It should be understood that certain detail changes may be made in the structural features of the present invention without departing from the spirit of the invention, so long as these changes fall within the scope of the appended claims.

What is claimed as new is:

1. A device of the class described comprising a casing having an open end, a plurality of coupling jaws carried by said casing, pivot pins pivotally securing said jaws within said casing, said jaws having forward ends adapted to spread apart relative to each other for receiving a coupling knob of a tractor vehicle, the jaws being adapted to automatically encase the coupling knob when the knob passes between the jaws, said jaws having rearward portions adapted to move toward and away from each other as the jaws are opened and closed, a coupling locking pin carried by said casing and adapted to drop between the rearward portions of the jaws to automatically lock the jaws in a closed and knob-encasing position, abutment ledges carried by said casing, abutment shoulders carried by said jaws engaging said ledges when said jaws are in a closed and knob-encircling position for bracing said jaws and relieving forward pulling strain from said pivot pins, and said abutment shoulders extending laterally of said ledges and being movable into and out of contact with said ledges as said jaws move to and from a closed position.

2. In combination with an upstanding vertical coupling member having an upper knob portion and a depending neck portion supporting said knob portion, a casing having an open end, said casing having a bottom wall provided with an inwardly extending slot to receive the neck portion of said vertical coupling member, a top wall carried by the casing in spaced relation to and overhanging said bottom wall thereby defining a socket within said casing, said upper knob portion supporting said top wall and thereby carrying the weight of the casing, coupling jaws mounted in said socket engageable with opposite sides of said knob for locking the vertical coupling member and casing together, pins pivotally securing said jaws in said socket, transverse abutment ledges carried by said casing in said socket, abutment shoulders carried by said jaws engaging said ledges when said jaws are in a knob-engaging position for bracing said jaws and relieving forward pulling strain from said pins, and said shoulders extending laterally of said ledges and being movable into and out of contact with said ledges as said jaws move to and from a knob-engaging position.

3. In combination with an upstanding vertical coupling member having an upper knob portion and a depending neck portion supporting said knob portion, a casing having an open end, said casing having a bottom wall provided with an inwardly extending slot to receive the neck portion of said vertical coupling member, a top wall carried by the casing in spaced relation to and overhanging said bottom wall thereby defining a socket within said casing, said upper knob portion supporting said top wall and thereby carrying the weight of the casing, coupling jaws mounted in said socket engageable with opposite sides of said knob for locking the vertical coupling member and casing together, pins pivotally securing said jaws in said socket, transverse abutment ledges carried by said casing in said socket, rearwardly of said pins, abutment shoulders carried by said jaws engaging said ledges when said jaws are in a knob-engaging position for bracing said jaws and relieving forward pulling strain from said pins, and said shoulders extending laterally of said ledges and being movable into and out of contact with said ledges as said jaws move to and from a knob-engaging position.

4. In combination with an upstanding vertical coupling member having an upper knob portion and a depending neck portion supporting said knob portion, a casing having an open end, said casing having a bottom wall provided with an inwardly extending slot to receive the neck portion of said vertical coupling member, a top wall carried by the casing in spaced relation to and overhanging said bottom wall thereby defining a socket within said casing, said upper knob portion supporting said top wall and thereby carrying the weight of the casing, coupling jaws mounted in said socket engageable with opposite sides of said knob for locking the vertical coupling member and casing together, pins pivotally securing said jaws in said socket, transverse abutment ledges carried by said casing in said socket, abutment shoulders carried by said jaws engaging said ledges when said jaws are in a knob-engaging position for bracing said jaws and relieving forward pulling strain from said pins, said shoulders extending laterally of said ledges and being movable into and out of contact with said ledges as said jaws move to and from a knob-engaging position, said jaws having rearwardly diverging portions adapted to swing toward and away from each other as the jaws are opened and closed, and a vertical coupling pin carried by said casing and adapted to drop between said rearward portions of said jaws to automatically lock the jaws in a closed knob-engaging position.

DONALD C. McCUNE.
HARRY BROOKS.

REFERENCES CITED

The following references are of record in the file of this patent:

UNITED STATES PATENTS

| Number | Name | Date |
| --- | --- | --- |
| 1,335,211 | Walker | Mar. 30, 1920 |
| 2,151,181 | Appell | Mar. 21, 1939 |
| 2,189,183 | Sherman | Feb. 6, 1940 |
| 2,347,033 | Daton | Apr. 18, 1944 |

FOREIGN PATENTS

| Number | Country | Date |
| --- | --- | --- |
| 511,173 | Germany | Oct. 27, 1930 |